United States Patent
Zagorski et al.

(10) Patent No.: US 9,771,070 B2
(45) Date of Patent: Sep. 26, 2017

(54) METHOD AND SYSTEM FOR CONTROLLING A HOST VEHICLE

(75) Inventors: Chad T. Zagorski, Clarkston, MI (US); Aamrapali Chatterjee, Okemos, MI (US); Jin-Woo Lee, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 615 days.

(21) Appl. No.: 13/315,942

(22) Filed: Dec. 9, 2011

(65) Prior Publication Data
US 2013/0151058 A1 Jun. 13, 2013

(51) Int. Cl.
| | |
|---|---|
| *G05D 1/00* | (2006.01) |
| *B60W 30/09* | (2012.01) |
| *G05D 1/02* | (2006.01) |
| *B60W 30/095* | (2012.01) |

(52) U.S. Cl.
CPC ........ *B60W 30/09* (2013.01); *B60W 30/0956* (2013.01); *G05D 1/0289* (2013.01); *B60W 2550/302* (2013.01); *B60W 2550/306* (2013.01)

(58) Field of Classification Search
CPC ..... B60W 30/08; B60W 30/085; B60W 30/09
USPC ................. 701/96, 301, 23, 26, 28
See application file for complete search history.

(56) References Cited

U.S. PATENT DOCUMENTS

| | | | |
|---|---|---|---|
| 6,278,360 B1* | 8/2001 | Yanagi ................... | B60Q 1/525 180/281 |
| 6,370,471 B1* | 4/2002 | Lohner et al. ................. | 701/96 |
| 6,816,084 B2* | 11/2004 | Stein ................... | B60K 31/0008 340/435 |
| 7,486,199 B2* | 2/2009 | Tengler ................ | G08G 1/0965 340/436 |
| 8,386,146 B2* | 2/2013 | Shirai ................ | B60K 31/0008 180/170 |
| 8,615,357 B2* | 12/2013 | Simon ................... | B60W 30/16 340/435 |
| 8,660,734 B2* | 2/2014 | Zhu ....................... | G05D 1/0214 701/23 |
| 8,744,666 B2* | 6/2014 | Switkes ................ | G08G 1/166 280/292 |
| 8,786,421 B2* | 7/2014 | Dozza ..................... | B60Q 1/44 340/468 |

(Continued)

FOREIGN PATENT DOCUMENTS

CN 101529486 A 9/2009

*Primary Examiner* — Thomas G Black
*Assistant Examiner* — Peter D Nolan
(74) *Attorney, Agent, or Firm* — Reising Ethington, P.C.

(57) ABSTRACT

A method and system that monitors the behavior of surrounding vehicles in order to predict and react to an upcoming hazard in the road, even in situations where the hazard has not been directly sensed. In an exemplary embodiment, the method monitors an area around the host vehicle and looks for the presence of one or more target vehicles. If target vehicles are detected, then the method evaluates their behavior, classifies their behavior into one of several categories, and assuming that their behavior suggests some type of upcoming hazard, develops an appropriate preemptive response for controlling the host vehicle. The preemptive response may include mimicking, copying and/or integrating with the behavior of the surrounding target vehicles according to so-called "flocking" techniques in order to avoid the otherwise unseen hazard.

15 Claims, 5 Drawing Sheets

(56) References Cited

U.S. PATENT DOCUMENTS

| | | | |
|---|---|---|---|
| 8,854,198 B2* | 10/2014 | Tengler | G08G 1/0965 340/435 |
| 2002/0021229 A1* | 2/2002 | Stein | B60K 31/0008 340/933 |
| 2003/0187578 A1 | 10/2003 | Nishira | |
| 2004/0030497 A1* | 2/2004 | Knoop et al. | 701/301 |
| 2005/0043879 A1* | 2/2005 | Desens et al. | 701/96 |
| 2005/0159876 A1* | 7/2005 | Sugano | 701/96 |
| 2005/0171676 A1* | 8/2005 | Seki | 701/96 |
| 2006/0095193 A1* | 5/2006 | Nishira et al. | 701/96 |
| 2006/0276964 A1* | 12/2006 | Sano | B60W 40/114 701/300 |
| 2007/0109146 A1* | 5/2007 | Tengler | G08G 1/0965 340/902 |
| 2007/0150196 A1* | 6/2007 | Grimm | B60T 7/22 701/301 |
| 2009/0096598 A1* | 4/2009 | Tengler | G08G 1/161 340/453 |
| 2009/0164083 A1* | 6/2009 | Thiel | 701/96 |
| 2009/0228184 A1* | 9/2009 | Ueyama | B60W 30/095 701/96 |
| 2010/0010699 A1 | 1/2010 | Taguchi | |
| 2010/0021011 A1* | 1/2010 | Shida | B60R 1/00 382/104 |
| 2010/0094509 A1* | 4/2010 | Luke | B60W 40/02 701/45 |
| 2010/0117813 A1* | 5/2010 | Lee | B60W 40/04 340/435 |
| 2010/0198477 A1* | 8/2010 | Shirai | B60K 31/0008 701/96 |
| 2011/0010094 A1* | 1/2011 | Simon | B60W 30/16 701/301 |
| 2012/0025969 A1* | 2/2012 | Dozza | B60Q 1/44 340/463 |
| 2012/0083960 A1* | 4/2012 | Zhu | G05D 1/0214 701/23 |
| 2013/0041576 A1* | 2/2013 | Switkes | G08G 1/166 701/123 |
| 2013/0066511 A1* | 3/2013 | Switkes | G08G 1/166 701/28 |
| 2014/0136045 A1* | 5/2014 | Zhu | G05D 1/0214 701/23 |
| 2014/0303870 A1* | 10/2014 | Switkes | G08G 1/166 701/96 |

* cited by examiner

METHOD AND SYSTEM FOR CONTROLLING A HOST VEHICLE

FIELD

The present invention generally relates to an active system for a vehicle and, more particularly, to an active vehicle system that monitors the behavior of one or more surrounding vehicles and alters, adjusts and/or controls operation of a host vehicle accordingly.

BACKGROUND

When driving a vehicle, the behavior of the surrounding vehicles can sometimes act as a preview or warning for unseen hazards in the road. For example, if a leading vehicle suddenly swerves to avoid a large pothole or piece of debris in the road, then this can act as a warning to trailing vehicles that there is an unseen hazard for which preparations should be made, even though the hazard is not currently in the field of view of the trailing vehicles. Other examples also exist where the behavior of the surrounding vehicles—whether they be leading vehicles out in front of a host vehicle or side-by-side vehicles that surround a host vehicle—can be useful to predict and prepare for upcoming situations that cannot be directly sensed by the host vehicle. This may be particularly true when the host vehicle is operating in some type of autonomous or semi-autonomous driving mode, such as those employed by adaptive cruise control systems, lane-centering systems, automatic lane change systems, freeway-limited autonomous driving systems, etc.

SUMMARY

According to one embodiment, there is provided a method of controlling a host vehicle. The method may comprise the steps of: (a) receiving target vehicle readings from one or more target vehicle sensor(s) that monitor an area around the host vehicle; (b) using the target vehicle readings to determine if one or more target vehicle(s) are currently located in the area around the host vehicle; (c) if there are one or more target vehicle(s) currently located in the area around the host vehicle, then using the target vehicle readings to evaluate the behavior of the target vehicle(s); and (d) using the evaluated behavior of the one or more target vehicle(s) to avoid a hazard in the upcoming road segment without directly sensing the hazard with the one or more target vehicle sensor(s).

According to another embodiment, there is provided a method of controlling a host vehicle. The method may comprise the steps of: (a) using target vehicle readings from one or more target vehicle sensor(s) to establish an observational area around the host vehicle; (b) analyzing the behavior of one or more target vehicle(s) within the observational area by identifying one or more vehicle maneuver(s); (c) categorizing the vehicle maneuver(s) as either a leading maneuver or a surrounding maneuver, a leading maneuver pertains to a maneuver by a target vehicle located in front of the host vehicle and a surrounding maneuver pertains to a maneuver by a target vehicle located on a side of the host vehicle; and (d) generating a preemptive response for the host vehicle based on the vehicle maneuver category, wherein the preemptive response causes an automatic acceleration, deceleration and/or steering of the host vehicle while the host vehicle is being driven in an autonomous or semi-autonomous mode.

According to another embodiment, there is provided a method of controlling a host vehicle. The method may comprise the steps of: (a) using target vehicle readings from one or more target vehicle sensor(s) to establish an observational area around the host vehicle; (b) analyzing the behavior of a plurality of target vehicles within the observational area, at least some of the target vehicles are located on the sides of the host vehicle; (c) using the behavior of the plurality of target vehicles to develop a preemptive response for the host vehicle, wherein the preemptive response automatically controls the lateral and/or longitudinal position of the host vehicle and is designed to integrate the host vehicle into the plurality of target vehicles; and (d) sending command signals that are representative of the preemptive response to one or more control module(s) within the host vehicle so that the lateral and/or longitudinal position of the host vehicle can be automatically controlled.

DRAWINGS

Preferred exemplary embodiments will hereinafter be described in conjunction with the appended drawings, wherein like designations denote like elements, and wherein.

DESCRIPTION

The active vehicle system described herein can be installed on a host vehicle and can monitor the behavior of one or more surrounding vehicles in order to predict or anticipate an upcoming hazard in the road—whether it be an object in the road or a traffic event or something else—and to react to such a hazard, even in situations where the hazard cannot be directly sensed by the host vehicle. In an exemplary embodiment, the active vehicle system monitors an area around the host vehicle while it is being driven and looks for the presence of one or more target vehicles. If target vehicles are detected, the active vehicle system may evaluate their behavior, classify their behavior into one of several categories, and assuming that their behavior suggests some type of upcoming hazard, the active vehicle system may develop an appropriate preemptive response. This response may include mimicking, copying and/or integrating with the behavior of the surrounding target vehicles according to so-called "flocking" techniques in order to avoid or at least mitigate the effects of the otherwise unseen hazard.

Figure 1:
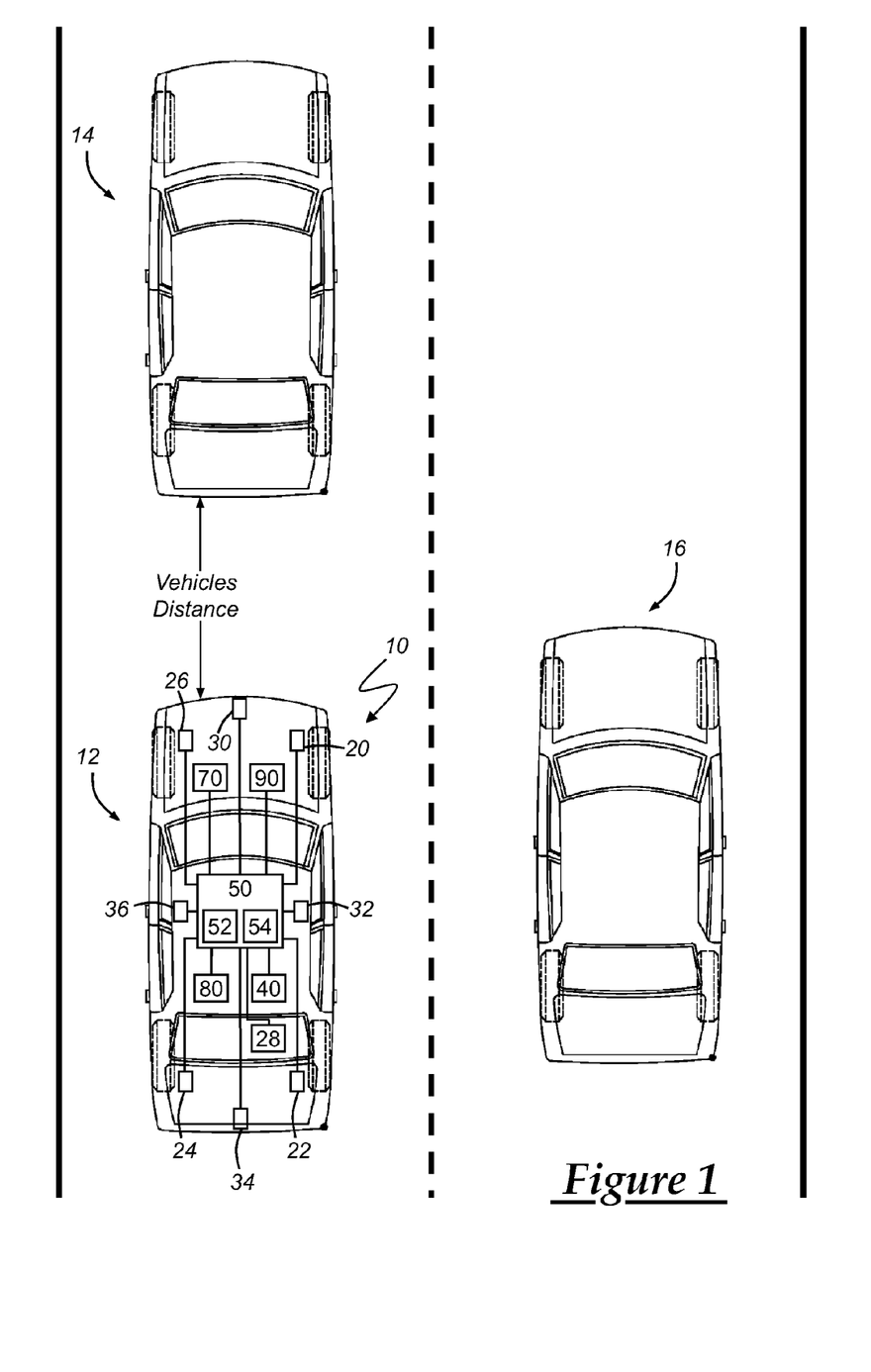
FIG. 1 is a schematic view showing a host vehicle that includes an exemplary active vehicle system and is surrounded by several other vehicles.

With reference to FIG. 1, there is shown a general and schematic view of an exemplary active vehicle system 10 installed on a host vehicle 12, where the system detects, monitors and/or evaluates the behavior of one or more surrounding target vehicles 14, 16 and reacts to their behavior accordingly. It should be appreciated that even though FIG. 1 only shows two target vehicles, active vehicle system 10 may be used in other situations, including situations having more or less target vehicles and ones where the target vehicles are located in front of, on one or both sides of, and/or are behind the host vehicle. It should also be appreciated that the present system may be used with any type of vehicle, including traditional vehicles, hybrid electric vehicles (HEVs), extended-range electric vehicles (EREVs), battery electrical vehicles (BEVs), motorcycles, passenger vehicles, sports utility vehicles (SUVs), cross-over vehicles, trucks, vans, buses, recreational vehicles (RVs), etc. These are merely some of the possible applications, as the system and method described herein are not limited to the exemplary embodiments shown in FIGS. 1-7 and could be implemented in any number of different ways.

According to one example, active vehicle system 10 includes host vehicle sensors 20-28, target vehicle sensors 30-36, navigation module 40, and control module 50, and is designed to interact with an engine control module 70, a brake control module 80 and/or a steering control module 90.

Any number of different sensors, components, devices, modules, systems, etc. may provide active vehicle system 10 with information or input that can be used by the present method. These include, for example, the exemplary sensors shown in FIG. 1, as well as other sensors that are known in the art but are not shown here. It should be appreciated that host vehicle sensors 20-28, target vehicle sensors 30-36, as well as any other sensor that is a part of and/or is used by system 10 may be embodied in hardware, software, firmware or some combination thereof. These sensors may directly sense or measure the conditions for which they are provided, or they may indirectly evaluate such conditions based on information provided by other sensors, components, devices, modules, systems, etc. Furthermore, these sensors may be directly coupled to control module 50, indirectly coupled via other electronic devices, a vehicle communications bus, network, etc., or coupled according to some other arrangement known in the art. These sensors may be integrated within another vehicle component, device, module, system, etc. (e.g., sensors that are already part of an engine control module (ECM), traction control system (TCS), electronic stability control (ESC) system, antilock brake system (ABS), etc.), they may be stand-alone components (as schematically shown in FIG. 1), or they may be provided according to some other arrangement. It is possible for any of the various sensor readings described below to be provided by some other component, device, module, system, etc. in host vehicle 12 instead of being directly provided by an actual sensor element. In some instances, multiple sensors might be employed to sense a single parameter (e.g., for providing redundancy). It should be appreciated that the foregoing scenarios represent only some of the possibilities, as active vehicle system 10 is not limited to any particular sensor or sensor arrangement and any suitable embodiment may be used.

Host vehicle sensors 20-28 provide active vehicle system 10 with host vehicle readings or other information that is pertinent to host vehicle 12 and can be used by the present method. In one embodiment, host vehicle sensors 20-26 generate readings that are representative of the position, velocity and/or acceleration of host vehicle 12, while host vehicle sensor 28 provides readings representative of vehicle dynamics like lateral acceleration, yaw rate, etc. Host vehicle sensors 20-28 may utilize a variety of different sensors and sensing techniques, including those that use rotational wheel speed, ground speed, accelerator pedal position, gear shifter selection, accelerometers, engine speed, engine output, and throttle valve position, to name a few. In the example shown in FIG. 1, individual wheel speed sensors 20-26 are coupled to each of the host vehicle's four wheels and separately report the rotational velocity of the four wheels. Skilled artisans will appreciate that these sensors may operate according to optical, electromagnetic or other technologies, and that other parameters may be derived or calculated from the velocity readings, such as longitudinal acceleration. In another embodiment, host vehicle sensors 20-26 determine vehicle speed relative to the ground by directing radar, laser and/or other signals towards known stationary objects and analyzing the reflected signals, or by employing feedback from a navigation module 40 that has Global Positioning System (GPS) capabilities. Vehicle dynamics sensor 28 can be mounted under one of the front seats or at any other suitable location within host vehicle 12 and senses vehicle dynamics such as vehicle lateral acceleration and yaw rate. As mentioned above, host vehicle sensors 20-26 may be part of some other device, module, system, etc., like an anti-lock braking system (ABS).

Target vehicle sensors 30-36 provide active vehicle system 10 with target vehicle readings or other information that is pertinent to one or more target vehicles and can be used by the present method. In one example, target vehicle sensors 30-36 generate target vehicle readings that are representative of the position, velocity and/or acceleration of target vehicles 14, 16. These readings may be absolute in nature (e.g., a target vehicle velocity or acceleration reading) or they may be relative in nature (e.g., a relative velocity or acceleration reading which is the difference between target and host vehicle accelerations, or a relative distance reading which is the range or distance between the host and target vehicles). Each of the target vehicle sensors 30-36 may be a single sensor or a combination of sensors, and may include a light detection and ranging (LIDAR) device, a radio detection and ranging (RADAR) device, a vision device (e.g., camera, etc.), a vehicle-vehicle communications device, or a combination thereof. According to an exemplary embodiment, target vehicle sensor 30 includes a forward-looking long-range RADAR or LIDAR device that is mounted on the front of the vehicle, such as at the front bumper or behind the vehicle grille, and monitors an area that extends for about 100 m in front of the host vehicle and includes the host vehicle lane plus one to two lanes on each side of the host lane. Similar types of sensors may be used for a rearward-looking target vehicle sensor 34 mounted on the rear of the vehicle, such as at the rear bumper or in the rear window, and for lateral or sideward-looking target vehicle sensors 32 and 36 mounted on each side of vehicle (e.g., driver and passenger sides); although, these sensors may have a smaller range that their forward-looking counterpart. A camera or other vision device could be used in conjunction with such sensors. Other embodiments are also possible.

Navigation module 40 uses the current position of host vehicle 12 to provide a variety of navigation-related services, including services and information provided to active vehicle safety system 10. Depending on the particular embodiment, navigation module 40 may be a stand-alone component or it may be integrated within some other component or system within the vehicle. The navigation module may include any combination of other components, devices, modules, etc., like a telematics unit or a GPS unit, and may use the current position of the vehicle and road- or map-data to evaluate an upcoming road segment. For instance, navigation module 40 may evaluate and determine the number of lanes in a road segment where host vehicle 12 is currently being driven, it may evaluate the status of the road segment (e.g., is there a lane closure, road construction, heavy traffic ahead, etc.), or it may determine if there is an abrupt change in the road segment (e.g., fork in the road ahead, sharp turn, etc.), to cite several possibilities. This type of navigation-related information may be provided to control module 50 so that it can be taken into account by the present method, as will be explained in more detail. It is also possible for navigation module 40 to have some type of user interface so that information can be verbally, visually or otherwise exchanged between the navigation module and the driver.

Control module 50 may include any variety of electronic processing devices, memory devices, input/output (I/O) devices, and/or other known components, and may perform various control and/or communication related functions. In an exemplary embodiment, control module 50 includes an electronic memory device 52 that stores various sensor readings (e.g., sensor readings from sensors 20-28 and 30-36), look up tables or other data structures, algorithms (e.g., the algorithm embodied in the exemplary method described below), etc. Memory device 52 may also store pertinent characteristics and background information pertaining to host vehicle 12, such as information relating to stopping distances, deceleration limits, temperature limits, moisture or precipitation limits, driving habits or other driver behavioral or historical data, etc. Control module 50 may also include an electronic processing device 54 (e.g., a microprocessor, a microcontroller, an application specific integrated circuit (ASIC), etc.) that executes instructions for software, firmware, programs, algorithms, scripts, applications, etc. that are stored in memory device 52 and may govern the processes and methods described herein. Control module 50 may be electronically connected to other vehicle devices, modules and systems via suitable vehicle communications and can interact with them when required. These are, of course, only some of the possible arrangements, functions and capabilities of control module 50, as other embodiments could also be used.

Depending on the particular embodiment, control module 50 may be a stand-alone vehicle electronic module (e.g., a sensor controller, an object detection controller, a safety controller, etc.), it may be incorporated or included within another vehicle electronic module (e.g., an active safety control module, brake control module, steering control module, engine control module, etc.), or it may be part of a larger network or system (e.g., an active safety system, a traction control system (TCS), electronic stability control (ESC) system, antilock brake system (ABS), freeway-limited autonomous driving system, adaptive cruise control system, lane departure warning system, etc.), to name a few possibilities. Control module 50 is not limited to any one particular embodiment or arrangement.

As mentioned above, active vehicle system 10 may interact with a number of other components, devices, modules and/or systems on host vehicle 12, including engine control module 70, brake control module 80 and/or steering control module 90. After active vehicle system 10 has detected one or more target vehicles in the surrounding area and has evaluated their behavior, the system may generate and send command signals to control modules 70, 80 and/or 90 so that unseen hazards in the upcoming road can be avoided. As a non-limiting example, control module 50 may determine from a sudden swerve by target vehicle 14 that there is an unseen pothole or piece of debris in the road and, in response to this, it may generate command signals for steering control module 90 that cause the steering module to perform automatic steering maneuvers that match or mimic those of target vehicle 14 so that the unseen hazard can be averted. Similar command signals could be generated by control module 50 and provided to engine control module 70 and/or brake control module 80 that cause them to perform automatic acceleration and/or braking maneuvers, respectively. Some examples of such control modules that may be particularly useful with exemplary system 10 include those that utilize drive-by-wire, brake-by-wire and steer-by-wire technologies. Control modules 70, 80 and/or 90 are not limited to any particular embodiment or arrangement, as any suitable module may be used.

Again, the preceding description of exemplary active vehicle system 10 and the drawing in FIG. 1 are only intended to illustrate one potential embodiment and the following method is not confined to use with only that system. Any number of other system arrangements, combinations and architectures, including those that differ significantly from the one shown in FIG. 1, may be used instead.

Figure 2:
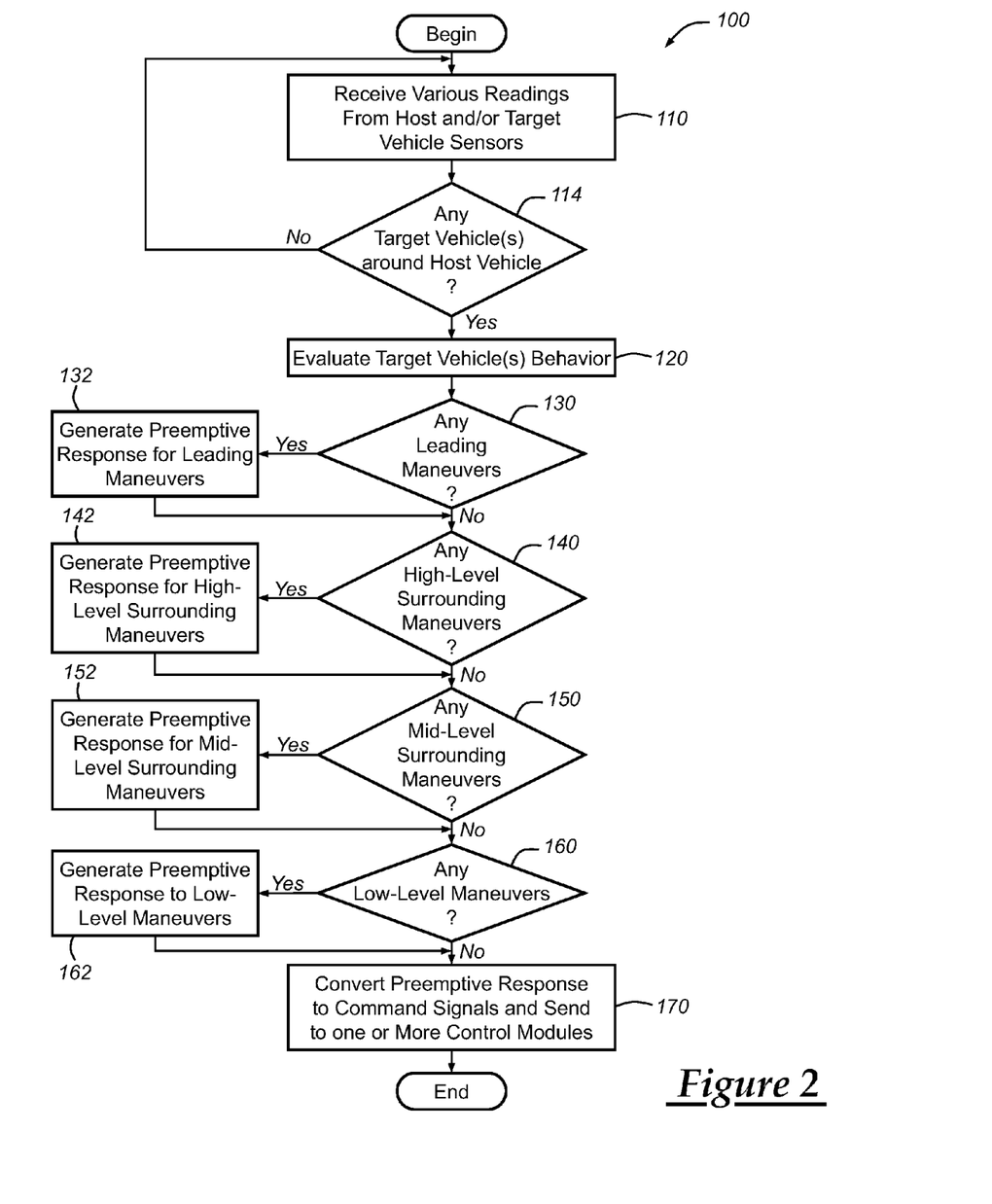
FIG. 2 is a flowchart illustrating some of the steps of an exemplary method that may be used to control a host vehicle, such as the one shown in FIG. 1.

Turning now to FIG. 2, there is shown an exemplary method 100 that may be used with active vehicle system 10 in order to monitor and evaluate the behavior of one or more surrounding target vehicles and to use their behavior to control a host vehicle by preemptively reacting to upcoming hazards in the road that may otherwise be unseen. As mentioned before, some hazards may not be detectible to host vehicle 12 due to the nature of the hazard (e.g., some potholes or other road surface disruptions may not be detectible by certain types of sensors) or because the hazard is currently being obstructed (e.g., a target vehicle may be blocking the host vehicle from seeing a piece of debris in the road). In such cases, it may be helpful to observe and analyze the behavior of the surrounding target vehicles in an effort to detect and react to the otherwise unseen hazards. It should be appreciated that the term "hazard," as used herein, may include any type of road surface feature (e.g., pothole, crack, curb, grate, etc.), object in the road (e.g., a truck tire, fallen tree limb or other debris, pedestrian, bicyclist, etc.), traffic event (e.g., lane closure, lane merging, lane narrowing, lane shifting, etc.) or any other item in the road that would typically elicit some type of avoidance response by a driver.

In one exemplary embodiment, method 100 is used when host vehicle 12 is already being operated in some type of autonomous or semi-autonomous driving mode (e.g., driving modes employed by adaptive cruise control systems, automatic lane change systems, freeway-limited autonomous driving systems, etc.), however, this is not necessary as the method may be used in non-autonomous driving modes as well. Some of the preemptive or anticipatory responses developed by method 100 cause host vehicle 12 to automatically perform certain driving maneuvers, such as those related to acceleration, deceleration and/or steering. These types of automatic or automated driving maneuvers lend themselves well to autonomous or semi-autonomous driving modes. If an autonomous or semi-autonomous driving mode is a prerequisite for method 100, then the method may check to see if such a mode is engaged before performing the steps of FIG. 2.

Beginning with step 110, the method receives various readings from a variety of host and/or target vehicle sensors. These different readings may be gathered or otherwise obtained on a regular or periodic basis, they may be obtained in response from a request by control module 50 or some other device, or they may be received in some other suitable fashion. According to an exemplary embodiment of step 110, host vehicle speed readings are received from wheel speed sensors 20-26, host vehicle dynamic readings are received from vehicle dynamics sensor 28, and target vehicle distance, velocity and/or acceleration readings are received from target vehicle sensors 30-36; any combination of the above-listed readings may be received at control module 50. By arranging target vehicle sensors 30-36 around the host vehicle, the method is able to establish an observational area or zone around the host vehicle for detecting one or more target vehicles and evaluating their behavior. The particular dimensions and other characteristics of the observational area may vary but, according to one example, it at least includes areas in front of the host vehicle and on its driver and passenger sides, and it is established while the host vehicle is being driven.

Step 114 then uses the target vehicle readings to determine if one or more target vehicles are currently located around the host vehicle. If there are no target vehicles currently present within the observational area surrounding host vehicle 12, then the method loops back to step 110 for continued monitoring. If, however, one or more target vehicles are present within the observational area, then the method proceeds to the next step so that their behavior can be evaluated and potentially utilized to help the host vehicle avoid some unseen hazard in the upcoming road segment.

Next, step 120 uses the target vehicle readings to evaluate the behavior of one or more target vehicles, and it may do so in a number of different ways. As mentioned above, the behavior of the surrounding target vehicles may be analyzed and used to detect the presence of an otherwise undetected hazard in the upcoming road segment and, in some cases, to develop an appropriate preemptive response. The analysis that takes place in step 120 may include any suitable technique and may be used to answer the questions posed in one or more subsequent steps. Generally speaking, step 120 may evaluate the behavior of the target vehicles by identifying certain vehicle maneuvers and classifying those maneuvers into one of several categories so that an appropriate preemptive or anticipatory response can be developed and carried out. Some potential maneuver categories include: leading maneuvers, high-level surrounding maneuvers, mid-level surrounding maneuvers, and low-level surrounding maneuvers, as will be explained in the following paragraphs which make reference to FIGS. 3-7.

Step 130 determines if any leading maneuvers have been performed by a leading target vehicle. The term "leading maneuver," as used herein, broadly refers to any driving maneuver or movement (whether it be related to acceleration, deceleration, steering, etc.) that is performed by one or more leading target vehicles located in front of the host vehicle. Some non-limiting examples of leading maneuvers include: when a leading target vehicle swerves to avoid a pothole or piece of debris 204 in the road (see example illustrated in FIG. 3), when a leading target vehicle moves over or shifts to a new lane in response to a lane closure or other traffic event (see example illustrated in FIG. 4), and when a leading vehicle negotiates a fork in the road or other road feature by following one of the available paths (not separately shown). Of course, there could be many other types of leading maneuvers, as the examples shown in FIGS. 3 and 4 are only meant to illustrate some of the possibilities.

Figure 3:
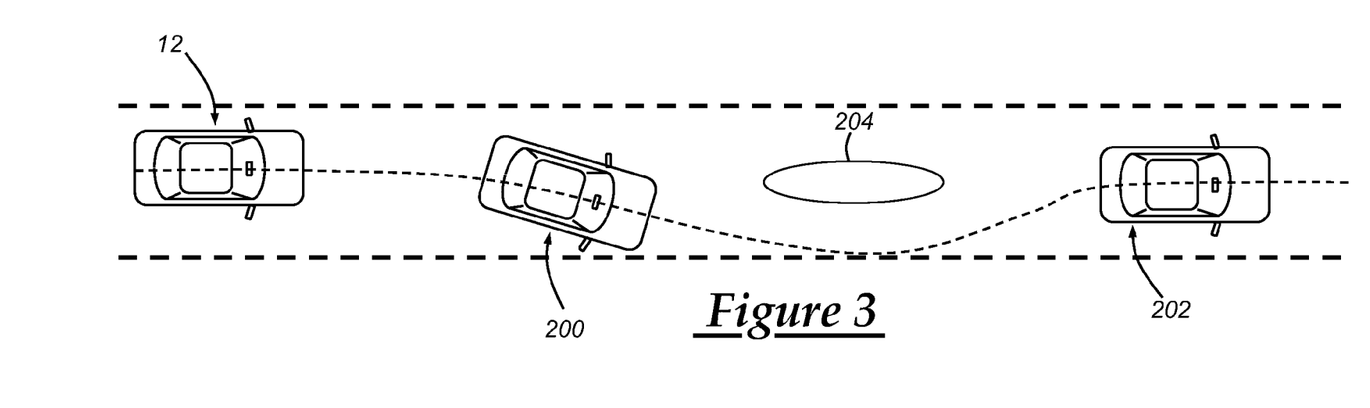
FIGS. 3-7 are schematic views demonstrating a number of different situations or scenarios that may warrant the use of the method shown in FIG. 2.

Beginning with FIG. 3, there is shown a situation where host vehicle 12 is following leading target vehicles 200 and 202 in the same lane, and both leading target vehicles have swerved to avoid a pothole 204 that is otherwise undetectable to the host vehicle. Step 130 may conclude that a leading maneuver has been performed by both of the leading target vehicles 200 and 202—namely, the sudden swerve to avoid the pothole—and, accordingly, that step may direct the method to step 132 so that an appropriate response can be developed. In order to be confident that a leading maneuver has actually been performed as opposed to an instance where the driver of the leading vehicle simply slips or makes some other inadvertent movement, step 130 may utilize a number of different techniques. For instance, step 130 could require multiple leading target vehicles to perform roughly the same maneuver before concluding that a "leading maneuver" has been detected (a corroboration technique), or this step may require that the maneuver exceed some minimum degree of suddenness or severity so that it clearly diverges from a historical driving pattern and is not simply a result of the driver inadvertently drifting out of their lane (a departure technique). It should be appreciated that other techniques and methods for determining when a leading maneuver has been performed could be used, as the preceding examples only represent some of the possibilities.

If step 130 determines that a leading vehicle has been performed by one or more leading target vehicles, then the method proceeds to step 132 so that a preemptive response may be generated for the host vehicle. Step 132 may generate a preemptive or anticipatory response in a variety of different ways, including using a so-called "follow-the-leader" approach where host vehicle 12 attempts to copy, mimic or otherwise emulate the driving maneuvers of leading target vehicles 200 and/or 202. If host vehicle 12 is able to gather comprehensive target vehicle readings for both target vehicles 200 and 202, then step 132 may attempt to generate a preemptive response that is modeled on an average or blend of the movements of both leading target vehicles. If, on the other hand, target vehicle 200 is preventing host vehicle 12 from having an unobstructed view of leading target vehicle 202, then step 132 may develop the preemptive response based largely on the actions or movements of target vehicle 200 which is in view. The preemptive or anticipatory response may include elements that alter, adjust and/or otherwise control the host vehicle's acceleration, deceleration, steering, etc. In the example of FIG. 3, the preemptive response may be designed to automatically decelerate host vehicle 12 and/or to automatically steer the host vehicle around pothole 204 at the appropriate time (a so-called "local avoidance maneuver"). Other embodiments are also possible.

Figure 4:
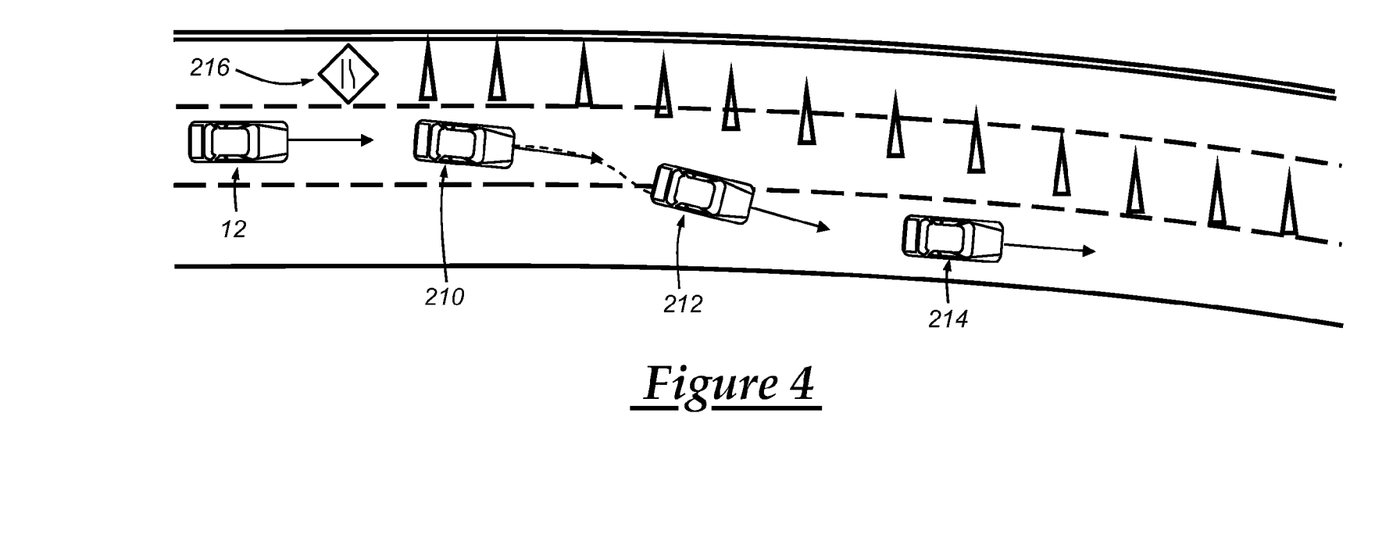

FIG. 4 illustrates another example of a leading maneuver, only this example is directed to a situation where there is a lane closure 216 that causes leading target vehicles 210, 212 and 214 to shift over a lane. After evaluating the behavior of leading target vehicles 210, 212 and 214, step 130 may determine that a leading maneuver has been detected and may send control of the method to step 132 for development of a preemptive response. Step 130 may employ the corroboration technique and/or the departure technique discussed above, as well as any other suitable technique in order to ensure a certain confidence level that a leading maneuver has, in fact, been detected. One such technique involves the use of navigation module 40, which can provide control module 50 with navigation-related information confirming that the host vehicle is currently in a construction zone where lane closures or other traffic events are likely (a confirmation technique). In this particular example, the preemptive or anticipatory response developed by step 132 may be designed to automatically decelerate host vehicle 12 and/or to automatically steer the host vehicle so that it gradually changes lanes and follows a path similar to that of target vehicles 210, 212 and/or 214. Again, the preemptive response developed in step 132 may include instructions that cause changes to the acceleration, deceleration, steering and/or some other operational aspect of the host vehicle.

Figure 5:
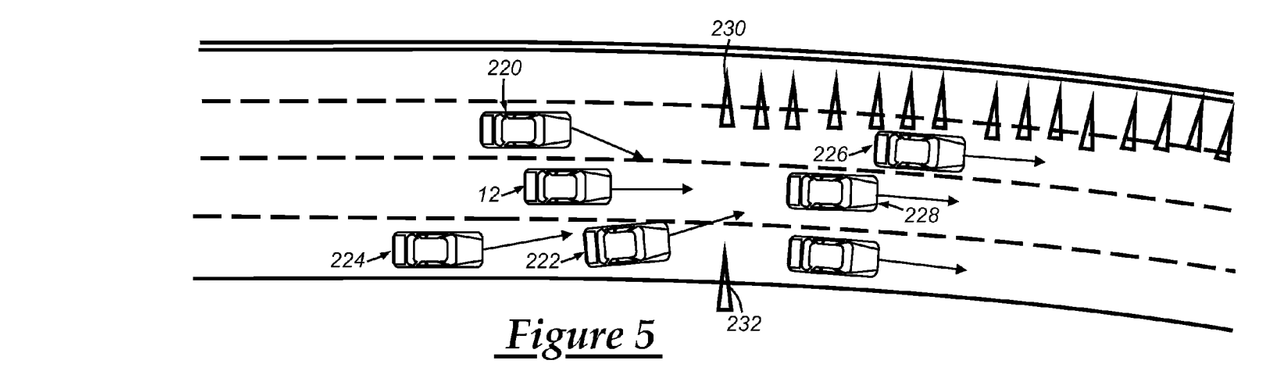
Figure 6:
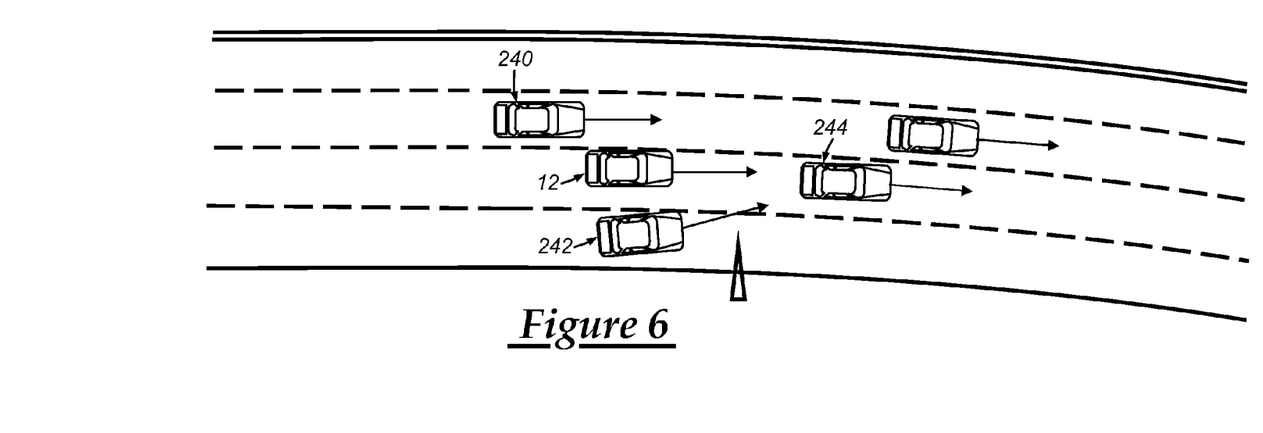

Returning to the exemplary flowchart shown in FIG. 2, step 140 determines if any high-level surrounding maneuvers have been detected or sensed around the host vehicle. The term "high-level surrounding maneuver," as used herein, broadly refers to any driving maneuver or action that is performed by one or more target vehicle(s) located on the sides of the host vehicle, where the maneuver causes the target vehicle(s) to encroach on the host vehicle and is likely to result in a collision within a certain period of time (e.g., 0.5 sec, 1 sec, 2 sec, 3 sec, 5 sec, etc.) if no remedial actions are taken. Some non-limiting examples of high-level surrounding maneuvers include: when multiple surrounding target vehicles move towards or encroach on the host vehicle (see example illustrated in FIG. 5), and when a single surrounding target vehicle encroaches on the host vehicle (see example in illustrated in FIG. 6). Of course, there could be many other types of high-level surrounding maneuvers, as the examples in FIGS. 5 and 6 are only meant to illustrate some of the possibilities. The present method may also identify and react to mid- and low-level surrounding maneuvers, as discussed below in more detail. If a high-level surrounding maneuver is detected, the present method may develop a preemptive or anticipatory response in step 142 so that a collision can be avoided or its severity at least mitigated.

FIG. 5 shows a situation where multiple surrounding target vehicles 220 and 222 are encroaching or converging on host vehicle 12 such that a collision will likely happen if no evasive actions are taken. Additional target vehicles are also nearby and potentially limit the optional preemptive responses available to host vehicle 12. In this particular example, surrounding target vehicles 220 and 222 are reacting to stationary hazards 230 and 232, respectively, located on different sides of the road, and host vehicle 12 is somewhat constrained by leading target vehicle 228 located in front. Step 140 may consider a number of factors when categorizing maneuvers as high-level or not, including the following: the distances between the host vehicle and each of the surrounding target vehicles, host and target vehicle velocity and/or acceleration (the scenario in FIG. 5 may be more concerning and thus warrant a higher level rating if it is occurring at 70 m.p.h., as opposed to 20 m.p.h.), and the presence of additional target vehicles in front of and/or behind the target vehicle that box it in, to cite a few possibilities.

If a high-level surrounding maneuver is detected, then the method proceeds to step 142 in order to develop an appropriate preemptive response so that the collision can be avoided or at least so that its impact may be minimized; this may be done in a variety of ways. According to an exemplary embodiment, step 142 uses the sensor readings from target vehicle sensors 30-36 in a flocking or other algorithm to generate a preemptive response that seeks to automatically control the lateral and/or longitudinal position of host vehicle 12 so that it can be integrated into the surrounding group of target vehicles. One way to control the lateral position is to automatically steer the host vehicle so that it maintains an equal lateral distance or separation with each of the target vehicles 220 and 222. This may involve host vehicle 12 moving to the left of the lane towards target vehicle 220, moving to the right of the lane towards target vehicle 222, or maintaining its current course in an effort to establish an equidistant separation with both of the target vehicles.

Control of the lateral and/or longitudinal position may be performed in terms of distance or in terms of time. For instance, step 142 could calculate the time it takes to perform each of several optional maneuvers that remove the host vehicle from a "non-viable" or imminent situation; these times could be balanced or considered in conjunction with the resulting position of the host vehicle after such maneuvers are performed, and may be weighted with a cost function or something else towards a lower vehicle velocity. Step 142 may also seek to maintain lane discipline so that the host vehicle only leaves its current lane when necessitated. In an exemplary embodiment, a cost function places emphasis on maintaining equidistant spacing with laterally adjacent target vehicles over lane discipline so that a balanced, yet prioritized, preemptive response can be achieved. Equidistant spacing (flocking results) may be emphasized or weighted over lane discipline during high-level surrounding maneuvers, while the reverse may be true during mid- and low-level surrounding maneuvers. Lateral control of host vehicle 12 is not limited to any particular embodiment, as any suitable approach may be used.

Longitudinal position may be controlled by either accelerating or decelerating the host vehicle so that it either pulls ahead or falls behind the surrounding target vehicles. For instance, the preemptive response developed by step 142 may include instructions to reduce the speed of host vehicle 12 (i.e., decelerate the vehicle) so that the host vehicle falls somewhat behind the converging paths of surrounding target vehicles 220 and 222, as shown in FIG. 5. The lack of a trailing target vehicle right behind host vehicle 12 makes this maneuver more viable; if there was a target vehicle directly behind host vehicle 12, then the preemptive response may consider accelerating the host vehicle instead. In the example of FIG. 5, the preemptive response may be designed to automatically decelerate or accelerate host vehicle 12 to avoid converging or encroaching target vehicles (controlling longitudinal position), to automatically steer host vehicle 12 so that it maintains an equal distance with the surrounding target vehicles (controlling lateral position), or some combination thereof. If the host vehicle is accelerated, the method may take steps to ensure that it does not exceed the local speed limit. Other embodiments are also possible.

FIG. 6 illustrates a scenario where a single surrounding target vehicle 242 is encroaching on host vehicle 12 such that a collision will likely happen if no evasive actions are taken. This, too, is an example of "high-level surrounding vehicle maneuvers," namely, the encroachment maneuvers being performed by surrounding target vehicle 242. An additional surrounding target vehicle 240 is located off to the side of host vehicle 12 and is staying within its own lane, and a leading target vehicle 244 is located in the same lane ahead of the host vehicle. If method 100 were to be applied to the situation represented in FIG. 6, then step 140 would detect high-level surrounding vehicle maneuvers by target vehicle 242, and step 142 would generate a preemptive response that causes host vehicle 12 to control its lateral and/or longitudinal position. The lateral position could be controlled by automatically steering host vehicle 12 so that roughly equal distances or separations are maintained between the host vehicle and target vehicles 240 and 242; that is, gently blending or guiding the host vehicle between the adjacent target vehicles so that the three of them are more tightly spaced in the lateral direction. The longitudinal position of host vehicle 12 could also be controlled through the preemptive response by accelerating or decelerating the host vehicle, relative to target vehicles 240 and 242. It should be appreciated that any of the features, techniques, methods, embodiments, etc. discussed above in conjunction with the example in FIG. 5 may be used here as well. This includes, but is certainly not limited to: flocking techniques seeking equidistant spacing with laterally adjacent target vehicles, calculations performed in terms of distance or time, favoring responses with lower vehicle velocities, favoring equidistant flocking results over lane discipline, etc.

Turning back to the exemplary flowchart shown in FIG. 2, step 150 determines if any mid-level surrounding maneuvers have been detected or sensed around the host vehicle. The term "mid-level surrounding maneuver," as used herein, broadly refers to any driving maneuver or action that is performed by one or more target vehicle(s) located on the sides of the host vehicle, where the maneuver causes the target vehicle(s) to encroach on the host vehicle but is not likely to result in a collision within a certain period of time (e.g., 0.5 sec, 1 sec, 2 sec, 3 sec, 5 sec, etc.). Some non-limiting examples of mid-level surrounding maneuvers include: when multiple surrounding target vehicles move towards or encroach on the host vehicle but the host vehicle still has enough lateral separation to operate within its lane (see example illustrated in FIG. 5, only with more lateral room for host vehicle 12), and when a single surrounding target vehicle encroaches on the host vehicle in a way that enables the host vehicle to still maintain lane discipline (see example illustrated in FIG. 6, only with more lateral room for host vehicle 12). Of course, there could be many other types of mid-level surrounding maneuvers, as the examples discussed here are only meant to illustrate some of the possibilities.

If a mid-level surrounding maneuver or situation is detected, the method proceeds to step 152 so that an appropriate preemptive response can be generated. Step 152 may employ any of the features, techniques, methods, embodiments, etc. discussed above in order to control the lateral and/or longitudinal position of host vehicle 12, as it relates to one or more surrounding target vehicles. Because mid-level surrounding maneuvers are representative of situations where there is some degree of encroachment or convergence but not enough that is likely to result in an imminent collision, step 152 may favor lane discipline over maintaining equidistant spacing (e.g., cost function gives lane discipline higher value). The exact contribution of each of these factors can vary based on the application and the particular circumstances. In an example of how lane discipline and inter-vehicle lateral spacing can be balanced during a mid-level situation, host vehicle 12 in FIG. 6 may shift or move over and away from target vehicle 242 towards the opposite edge of its current lane without exiting the lane and crossing the lane markings. Lane discipline is thus maintained (host vehicle did not exit current lane), yet as much lateral spacing as possible is produced between vehicles 12 and 242. The host vehicle may use any suitable on-vehicle sensor, GPS unit, etc. to determine the boundaries of the different lanes.

Step 160 checks to see if any low-level maneuvers have been detected or sensed around the host vehicle. The term "low-level maneuver," as used herein, broadly refers to any driving maneuver or action that is performed by one or more target vehicle(s) located around the host vehicle, where the maneuver does not currently rise to the level of a high- or mid-level maneuver but may present a potential problem with the host vehicle in the future. Some non-limiting examples of low-level maneuvers include: when a surrounding target vehicle is driving in a blind spot of the host vehicle for a certain amount of time (see example illustrated in FIG. 7), when a trailing target vehicle is following the host vehicle at an unsafe distance (i.e., tailgating; see example also illustrated in FIG. 7), and when one vehicle is merging or changing lanes in a manner that results in it being in front of or behind another vehicle at an uncomfortably close distance (merging vehicle 264 in FIG. 7). These situations relate to issues of driving courtesy, and step 160 may check for instances when these discourteous driving maneuvers are being performed not only by target vehicles, but by the host vehicle as well. Of course, there could be many other types of low-level or discourteous driving maneuvers, as the preceding examples only represent some of the possibilities.

If a low-level maneuver or situation is detected, the method proceeds to step 162 so that an appropriate preemptive response can be generated. Step 162 may employ any of the features, techniques, methods, embodiments, etc. discussed above in order to control the lateral and/or longitudinal position of host vehicle 12, as it relates to one or more surrounding target vehicles. In the case where target vehicle 260 is tailgating host vehicle 12 (see FIG. 7), step 162 may develop a preemptive or anticipatory response that causes the host vehicle to speed up, slow down, change lanes, or perform some other automatic maneuver that addresses and/or removes the low-level situation. The decision to speed up or slow down may be dictated by whether or not the host vehicle is currently in a fast lane or a slow lane. Step 162 may first confirm that there is not a target vehicle already located in the lane or position in which the host vehicle wishes to move.

Figure 7:
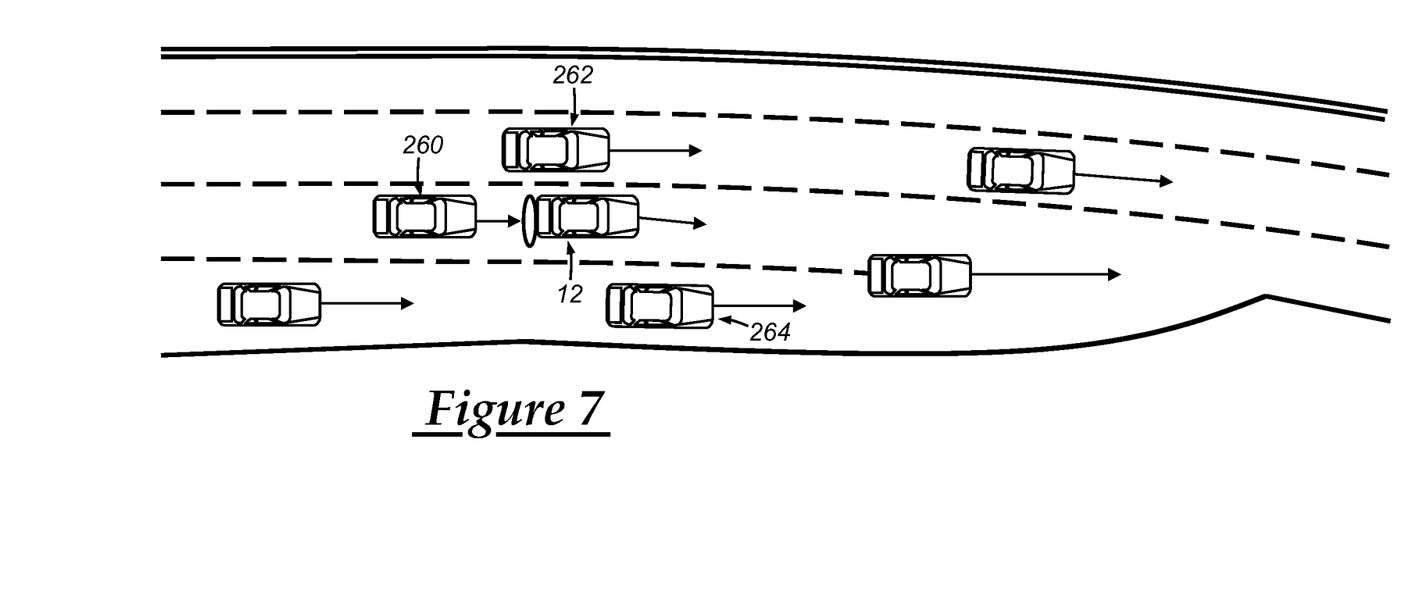

In the example where target vehicle 262 is traveling in the blind spot of host vehicle 12, a preemptive response may be developed that automatically accelerates or decelerates the host vehicle within its current lane, or causes the host vehicle to change lanes. In instances where the host vehicle is driving in a slower lane than the target vehicle (as shown in FIG. 7), the host vehicle may temporarily increase its speed in order to separate from the target vehicle and remove the blind spot situation. If the host vehicle is in a faster lane than the offending target vehicle, a preemptive response may be developed that reduces the host vehicle velocity. The same concepts apply to situations where the host vehicle is in the blind spot of some target vehicle, as opposed to the other way around, and such maneuvers should be performed when traffic conditions allow. Some blind spot situations are identified as when there is a nearly equal longitudinal and lateral distance between a host vehicle and a target vehicle. Other actions could be included within the preemptive response, and the response may perform the precautionary checks above where it checks first to make sure that the desired position is open and available. Again, step 162 is also applicable to situations where host vehicle 12 is the vehicle performing the so-called discourteous driving maneuver, as opposed to the other way around.

FIG. 7 illustrates another situational example of a low-level maneuver where target vehicle 264 is accelerating and is going to merge right in front of host vehicle 12 from a lane that is ending. In this case, target vehicle 264 is not on a path that currently extrapolates into a collision with host vehicle 12 (thus, why it is not categorized as a high-level surrounding maneuver, etc.), but it may end up in an uncomfortably close position right in front of the host vehicle. The preemptive response in step 162 may cause host vehicle 12 to slow down to avoid this situation, so long as that is not likely to result in a collision with the trailing target vehicle 260. Other considerations may be weighed and factored as well. In a different embodiment, target vehicle 264 is merging closely behind host vehicle 12 such that the preemptive response causes the host vehicle to increase its velocity. Skilled artisans will appreciate that the techniques described herein may also apply when the host vehicle is the merging vehicle.

At step 170, the method sends command signals to one or more controllers or modules located around the host vehicle so that the vehicle can implement, execute or otherwise carry out a preemptive response. The precise manner in which the preemptive responses are converted into command signals and transmitted throughout host vehicle 12 may vary, and the method is not limited to any one particular embodiment. For instance, control module 50 may send out command signals to engine control module 70, brake control module 80 and/or steering control module 90 each time a preemptive response is generated in steps 132, 142, 152, 162; that is, the method may convert the preemptive response into command signals and send them out at the point of steps 132, 142, 152, 162. In another embodiment, the method may wait until step 170 and then combine, merge or otherwise integrate the individual contributions of the different preemptive responses—assuming that multiple preemptive responses have been generated—into a single set of command signals that can then be sent from control module 50 to engine control module 70, brake control module 80 and/or steering control module 90. To illustrate these different embodiments, consider the example where step 140 senses a high-level maneuver and step 160 senses a low-level maneuver. In the former embodiment, separate command signals representing separate preemptive responses would be sent out at steps 142 and 162; in the latter embodiment, combined or blended command signals would be sent out at step 170 that take both preemptive responses into account. Different techniques and methods may be used for combining or integrating preemptive responses, including ones that weigh the preemptive response for high-level maneuvers or situations more heavily than those for mid- and low-level ones; different flags, settings, variables, etc. may be used for this purpose, where if a high-level flag is set, then the method would ignore mid- and low-level responses. It is possible for step 170 to look for high-level preemptive responses first, followed by mid-level preemptive responses and finally low-level and/or leading vehicle maneuvers.

The command signals sent out in step 170 may cause the host vehicle to automatically engage in some type of driving maneuver, such as one that accelerates, decelerates or steers the host vehicle. As previously mentioned, it is foreseen that method 100 could be executed when host vehicle 12 is already operating in some type of autonomous or semi-autonomous driving mode, such as those employed by adaptive cruise control systems, automatic lane change systems, freeway-limited autonomous driving systems, etc. The following paragraph provides some examples of other potential techniques that may be used with method 100.

Method 100 may identify and distinguish potential collisions or maneuvers that involve stationary objects versus those that involve moving ones. For example, if step 140 senses a high-level surrounding vehicle maneuver, then it may further determine if any of the objects involved are stationary (e.g., guide rails and other objects along the shoulder of the road) and, if so, give more deference or lateral space to the stationary objects than the moving ones so that the stationary objects are avoided. The method may also consider reducing the speed of the host vehicle if the host vehicle enters the shoulder of the road or encounters some other condition that warrants slower speeds. In addition, method 100 may change or alter a preemptive response if it is apparent that a collision or other undesirable outcome is becoming unavoidable, in which case the method may put a higher priority on avoiding and/or mitigating the collision than other concerns, like staying within its lane (lane discipline). Method 100 may use a variety of techniques for determining lateral and/or longitudinal ranges or spacing, including the use of predetermined ranges or calculated ranges, ranges that are speed-dependent, and/or ranges that are determined using different types of "flocking" rules, etc. The present method may also utilize input from any combination of object sensors on the vehicle, including those sensors that evaluate the upcoming road surface with cameras, RADAR, LIDAR and the like.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of controlling a host vehicle, comprising the steps of:
    (a) receiving target vehicle readings from one or more target vehicle sensor(s) that monitor an area in front of the host vehicle;
    (b) using the target vehicle readings to determine if one or more leading target vehicle(s) are currently located in the area in front of the host vehicle;
    (c) if there are one or more leading target vehicle(s) currently located in the area in front of the host vehicle, then using the target vehicle readings to evaluate the behavior of the leading target vehicle(s) by identifying a leading vehicle maneuver in the form of a leading target vehicle swerving to avoid an object in the upcoming road segment and classifying the leading vehicle maneuver in one of a plurality of categories; and
    (d) using the evaluated behavior of the one or more leading target vehicle(s) and the classified leading vehicle maneuver to develop a preemptive response that causes the host vehicle to automatically copy, mimic or otherwise emulate the leading vehicle maneuver so that the host vehicle avoids an otherwise unseen hazard in the upcoming road segment without directly sensing the hazard with the one or more target vehicle sensor(s).

2. The method of claim 1, wherein step (a) further comprises receiving target vehicle readings from one or more RADAR or LIDAR target vehicle sensor(s) that form an observational area around the host vehicle.

3. The method of claim 1, wherein step (a) further comprises receiving target vehicle readings from a plurality of target vehicle sensors that form an observational area around the host vehicle, at least one of the target vehicle sensors is generally directed to an area in front of the host vehicle, at least one of the target vehicle sensors is generally directed to an area on a driver side of the host vehicle, and at least one of the target vehicle sensors is generally directed to an area on a passenger side of the host vehicle.

4. The method of claim 1, wherein step (c) further comprises identifying a leading vehicle maneuver by employing a departure technique that requires the maneuver to exceed some minimum degree of suddenness or severity before concluding that a leading vehicle maneuver has taken place.

5. The method of claim 1, wherein step (c) further comprises evaluating the behavior of one or more surrounding target vehicle(s) located to the lateral sides of the host vehicle by identifying a surrounding vehicle maneuver; and step (d) further comprises using the surrounding vehicle maneuver to develop a preemptive response that controls the lateral position of the host vehicle relative to the surrounding target vehicle(s).

6. The method of claim 1, wherein step (d) further comprises avoiding the hazard in the upcoming road segment by automatically controlling at least one of the following operations while the host vehicle is being operated in an autonomous or semi-autonomous mode: vehicle acceleration, vehicle deceleration or vehicle steering.

7. A method of controlling a host vehicle, comprising the steps of:
(a) receiving target vehicle readings from one or more target vehicle sensor(s) that monitor an area in front of the host vehicle;
(b) using the target vehicle readings to determine if one or more leading target vehicle(s) are currently located in the area in front of the host vehicle;
(c) if there are one or more leading target vehicle(s) currently located in the area in front of the host vehicle, then using the target vehicle readings to evaluate the behavior of the leading target vehicle(s) by identifying a leading vehicle maneuver in the form of a leading target vehicle shifting lanes to address a traffic event in the upcoming road segment and classifying the leading vehicle maneuver in one of a plurality of categories; and
(d) using the evaluated behavior of the one or more leading target vehicle(s) and the classified leading vehicle maneuver to develop a preemptive response that causes the host vehicle to automatically copy, mimic or otherwise emulate the leading vehicle maneuver so that the host vehicle also addresses the traffic event in the upcoming road segment without directly sensing the traffic event with the one or more target vehicle sensor(s).

8. A method of controlling a host vehicle, comprising the steps of:
(a) receiving target vehicle readings from one or more target vehicle sensor(s) that monitor an area in front of the host vehicle;
(b) using the target vehicle readings to determine if one or more leading target vehicle(s) are currently located in the area in front of the host vehicle;
(c) if there are one or more leading target vehicle(s) currently located in the area in front of the host vehicle, then using the target vehicle readings to evaluate the behavior of the leading target vehicle(s) by identifying a leading vehicle maneuver and employing a corroboration technique that requires multiple leading target vehicles to perform roughly the same maneuver before concluding that a leading vehicle maneuver has taken place; and
(d) using the leading vehicle maneuver to develop a preemptive response that avoids a hazard in the upcoming road segment without directly sensing the hazard with the one or more target vehicle sensor(s).

9. A method of controlling a host vehicle, comprising the steps of:
(a) receiving target vehicle readings from one or more target vehicle sensor(s) that monitor an area in front of the host vehicle;
(b) using the target vehicle readings to determine if one or more leading target vehicle(s) are currently located in the area in front of the host vehicle;
(c) if there are one or more leading target vehicle(s) currently located in the area in front of the host vehicle, then using the target vehicle readings to evaluate the behavior of the leading target vehicle(s) by identifying a leading vehicle maneuver and employing a confirmation technique that uses navigation-related information provided by a navigation module before concluding that a leading vehicle maneuver has taken place; and
(d) using the leading vehicle maneuver to develop a preemptive response that avoids a hazard in the upcoming road segment without directly sensing the hazard with the one or more target vehicle sensor(s).

10. A method of controlling a host vehicle, comprising the steps of:
(a) receiving target vehicle readings from one or more target vehicle sensor(s) that monitor an area around the host vehicle;
(b) using the target vehicle readings to determine if one or more surrounding target vehicle(s) are currently located in the area around the host vehicle;
(c) if there are one or more surrounding target vehicle(s) currently located in the area around the host vehicle, then using the target vehicle readings to evaluate the behavior of the surrounding target vehicle(s) located on the lateral sides of the host vehicle by identifying a high-level surrounding maneuver in the form of first and second surrounding target vehicles laterally encroaching on the host vehicle where the first and second surrounding target vehicles are on each side of the host vehicle and a collision is likely to occur, and classifying the surrounding vehicle maneuver in one of a plurality of categories; and
(d) using the evaluated behavior of the one or more surrounding target vehicle(s) and the classified surrounding vehicle maneuver to develop a preemptive response that controls the lateral position of the host vehicle relative to the surrounding target vehicle(s) by seeking to maintain an equidistant lateral spacing between the host vehicle and the first and second surrounding target vehicles.

11. The method of claim 10, wherein step (c) further comprises identifying a mid-level surrounding maneuver in the form of one or more surrounding target vehicle(s) laterally encroaching on the host vehicle where a collision is not likely to occur; and step (d) further comprises developing a preemptive response that seeks to maintain the host vehicle within its current lane.

12. The method of claim 10, wherein step (d) further comprises developing a preemptive response that seeks to maintain an equidistant lateral spacing between the host vehicle and first and second surrounding target vehicles on each side of the host vehicle and seeks to maintain the host vehicle within its current lane.

13. The method of claim 10, wherein step (c) further comprises identifying a low-level maneuver in the form of one or more target vehicle(s) performing a discourteous driving maneuver that may present a potential problem with the host vehicle in the future; and step (d) further comprises using the discourteous driving maneuver to develop a preemptive response that seeks to address the potential problem.

14. The method of claim 10, wherein step (d) further comprises developing a preemptive response that controls the longitudinal position of the host vehicle relative to the surrounding target vehicle(s) by either accelerating or decelerating the host vehicle.

15. The method of claim 14, wherein the preemptive response is weighted towards decelerating the host vehicle to a lower speed.

* * * * *